INVENTORS
WILLIAM A. RHODES,
RAYMOND A. HENES

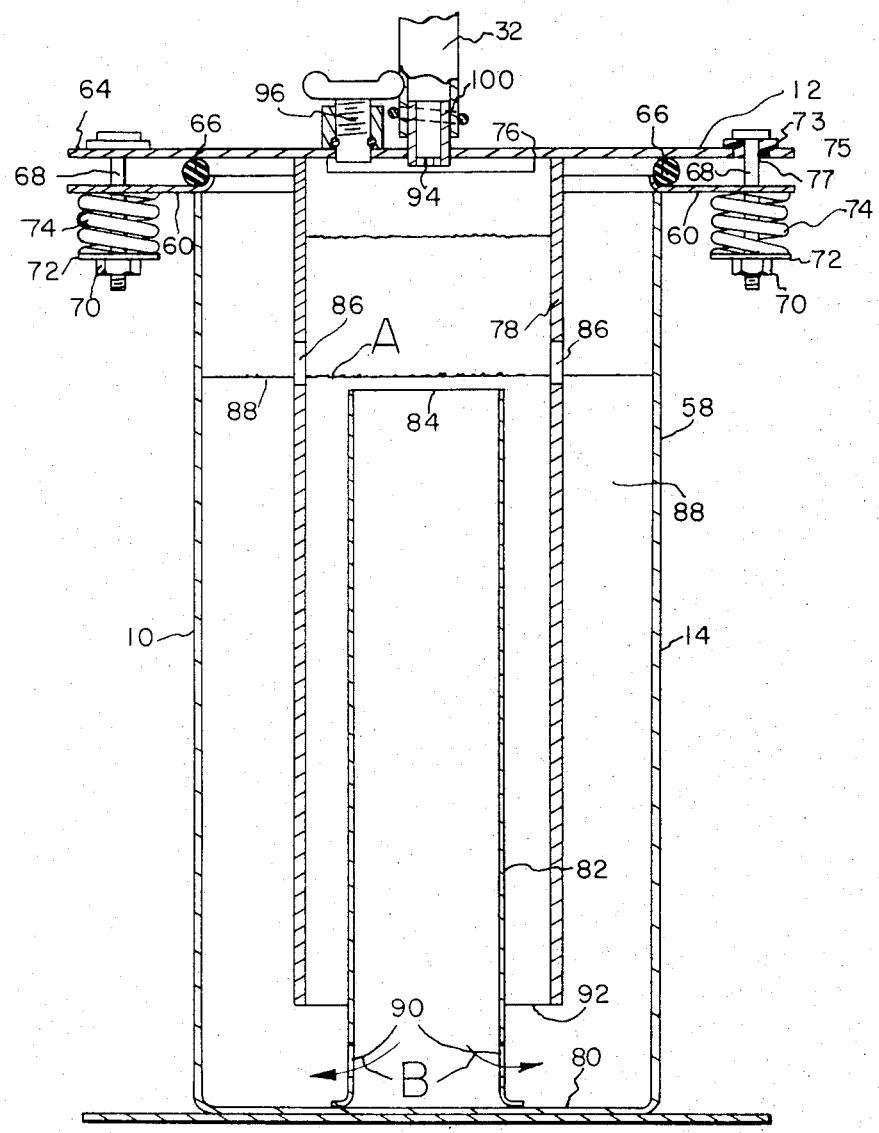

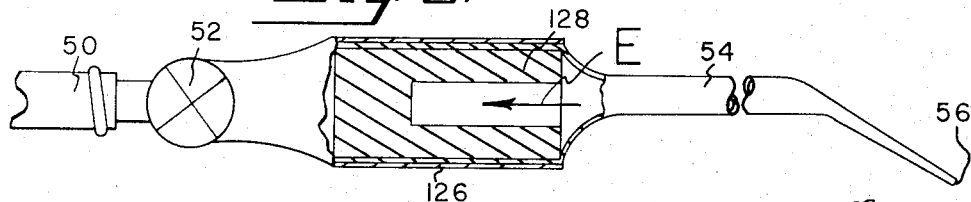
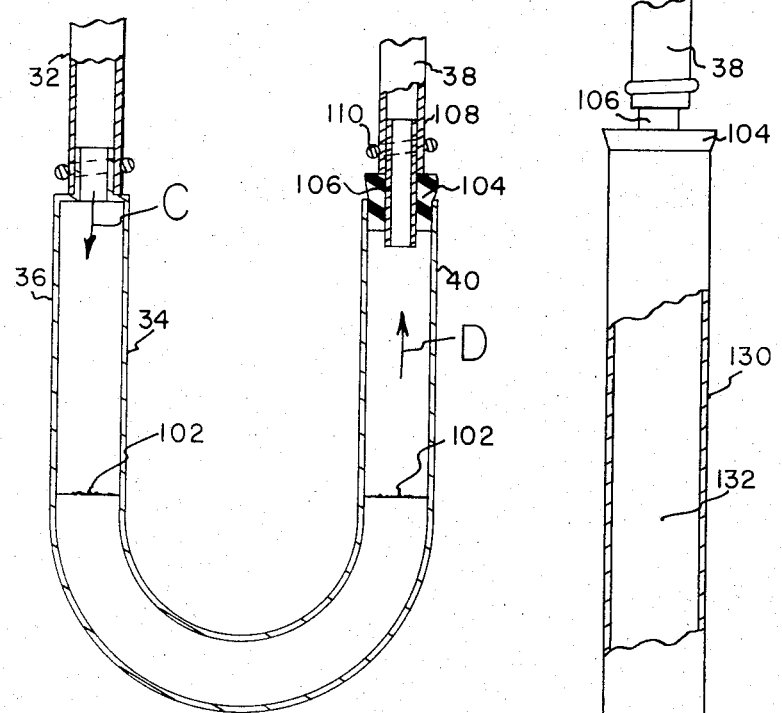
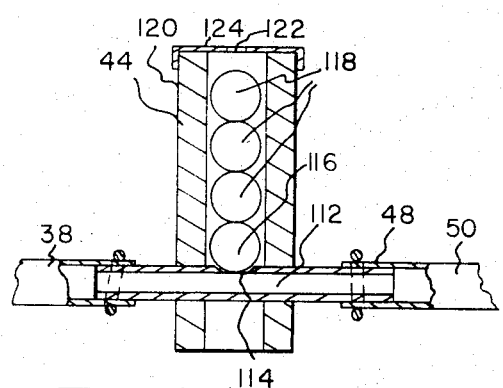

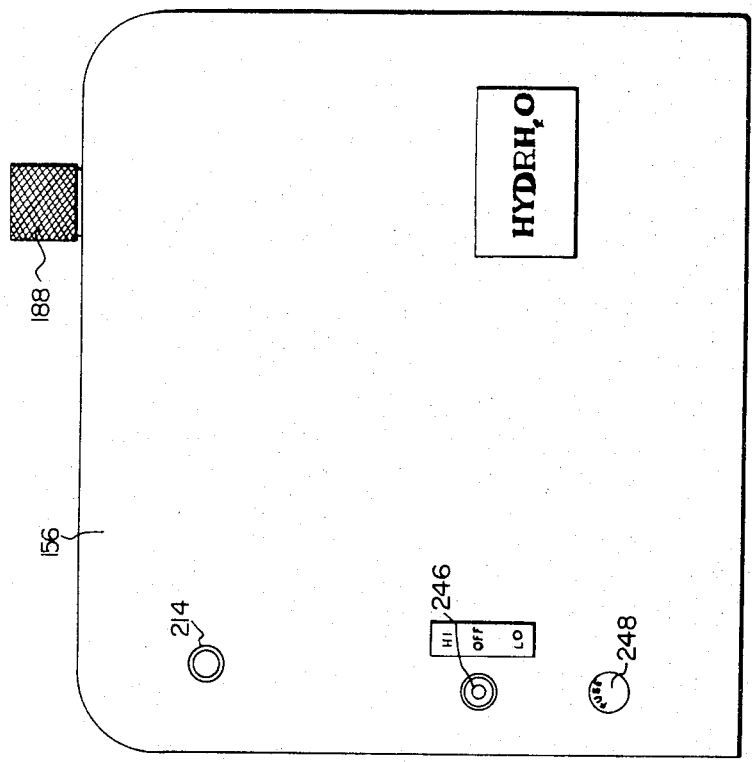
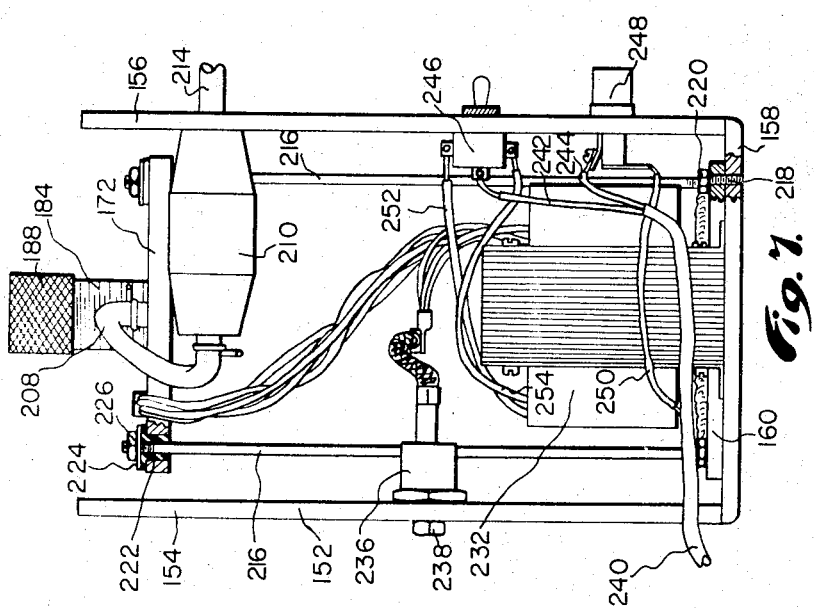

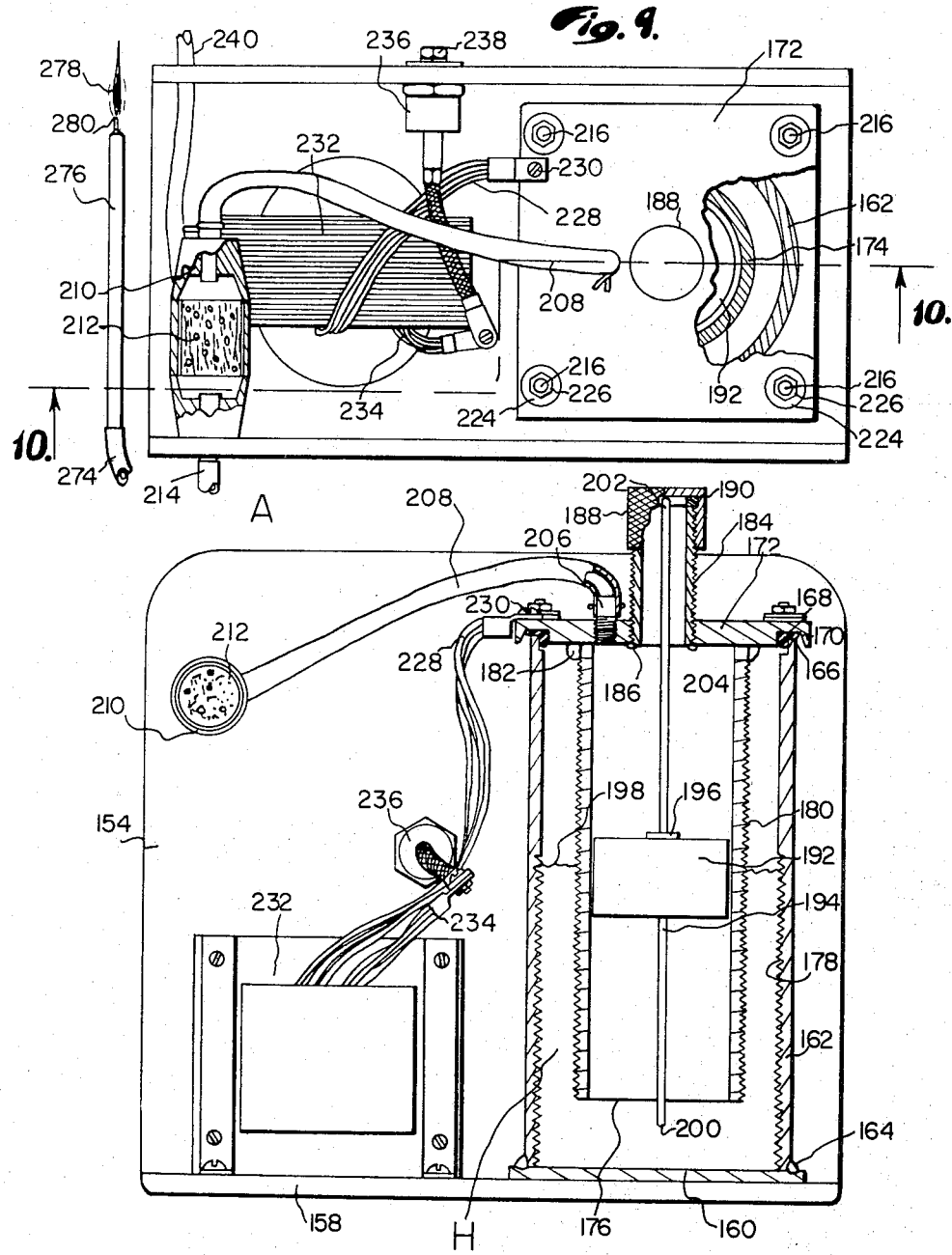

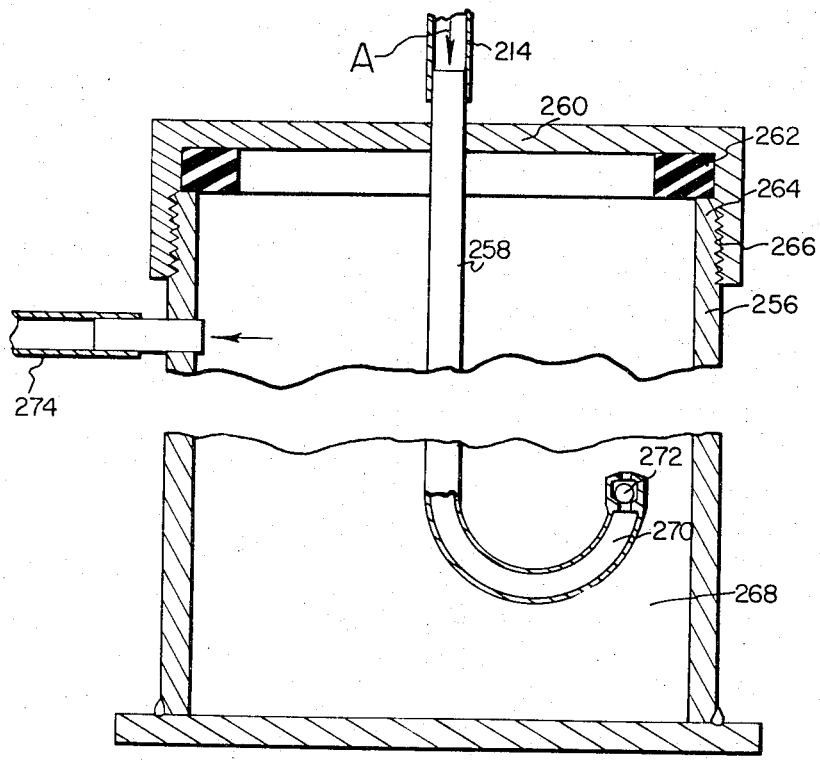
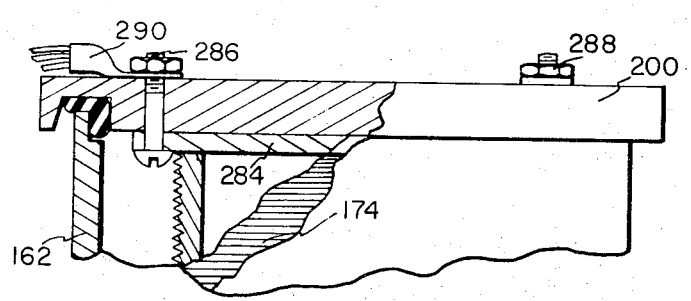

United States Patent Office 3,357,472
Patented Dec. 12, 1967

3,357,472
MEANS AND METHOD FOR THE ELECTROLYTIC
PRODUCTION OF HYDROGEN AND OXYGEN
FOR THE SAFE CONSUMPTION THEREOF
William A. Rhodes and Raymond A. Henes, Phoenix,
Ariz., assignors to Henes Manufacturing Co., Phoenix,
Ariz., a corporation of Arizona
Original application Mar. 23, 1962, Ser. No. 182,726, now
Patent No. 3,262,872, dated July 26, 1966. Divided and
this application Oct. 18, 1965, Ser. No. 510,119
7 Claims. (Cl. 158—27.4)

ABSTRACT OF THE DISCLOSURE

A generator for electrolytic production of hydrogen and oxygen having a common conduit for delivery of the hydrogen and oxygen to a torch; said torch having a very small orifice for emission of hydrogen and oxygen to a flame tip of the torch; and porous means in the gas passage from the generator to the torch serving as a flashback arrestor to prevent the flame from being transmitted from the torch tip back to the generator.

This is a division of application Ser. No. 182,726, filed Mar. 23, 1962 now Patent No. 3,262,872, which in turn is a continuation-in-part of application Ser. No. 108,164 filed May 5, 1961, and now abandoned.

This invention relates to a means and method for the electrolytic production of hydrogen and oxygen and for the safe consumption thereof, by a torch or other means controlling the combustion of these gases.

It has been a problem to utilize a mixture of hydrogen and oxygen in a torch and particularly so when hydrogen and oxygen is produced electrolytically and delivered in a common conduit to such a torch. The explosion hazards of this mixture of gases have been difficult to alleviate.

Additionally, it has been a problem to control the production quantity of hydrogen and oxygen, and to dispose of excess of these gases without creating a hazardous condition. Furthermore, a simple, economical and reliable arrestor for use in stopping combustion of these gases, as it flashes back from a torch toward the generator of such gases, has been very difficult to develop.

Accordingly, it is an object of the invention to provide a means for electrolytically producing a mixture of hydrogen and oxygen from water and to conduct the mixture directly to a torch for combustion thereof, without the hazard of dangerous explosions.

Another object of the invention is to provide novel means for resisting flame travel, in a balanced mixture of hydrogen and oxygen from a torch to a production source of hydrogen and oxygen.

Another object of the invention is to provide means for electrolytically producing hydrogen and oxygen, having a bleed-off pressure regulator disposed in the path of a forced air draft which dilutes the excess production of hydrogen and oxygen combustible in the atmosphere.

Another object of the invention is to provide a novel bleed-off pressure regulator for use in handling various compressible fluids.

Another object of the invention is to provide a novel generator for electrolytically producing hydrogen and oxygen in water.

Another object of the invention is to provide a torch and safe means, coupled thereto, for electrolytically producing hydrogen and oxygen and for safely delivering a mixture of these gases to said torch.

Another object of the invention is to provide a very simple and economical torch means having a safe source of electrolytically produced hydrogen and oxygen.

Another object of the invention is to provide a generator wherein hydrogen and oxygen are electrolytically produced in the presence of a highly concentrated alkali in water, whereby the size of the generator may be reduced in size versus gas delivery volume ratio not attained heretofore.

Another object of the invention is to provide a generator for electrolytically producing hydrogen and oxygen; said generator comprising novel, resilient pressure relief mechanism to prevent damage to the generator in the event combustion of hydrogen and oxygen takes place therein.

Another object of the invention is to provide a novel combination of hydrogen and oxygen generator; a rectifier for supplying energy to the generator and a bleed-off pressure regulator for controlling pressure of the mixture of hydrogen and oxygen and oxygen passing from said generator; a blower disposed to force a draft of air over said rectifier for cooling the same disposed to force air over said bleed-off pressure regulator to dilute the excess mixture of hydrogen and oxygen bled therefrom, to thereby render said bleed-off mixture non-combustible.

Another object of the invention is to provide a very compact generator for electrolytic production of hydrogen and oxygen which is provided with novel extended surface area anode and cathode structure formed of concentric tubular members whereon annular surfaces are provided with circumferential ridges and grooves.

Another object of the invention is to provide a novel generator for electrolytically producing hydrogen and oxygen wherein a very simple float structure readily indicates the fluid level in the generator and is readily accessible by removing a filler cap from a filler neck through which water may be added to the electrolyte in the generator.

Another object of the invention is to provide a novel generator for electrolytically producing hydrogen and oxygen wherein a novel frame heat sink structure supports the generator and other components thereof including an AC-DC power supply means which also dissipates heat to the frame and heat sink structure of the invention.

Another object of the invention is to provide a novel generator for electrolytically producing of hydrogen and oxygen which delivers a mixture of hydrogen and oxygen through a novel tank of methyl alcohol or equivalent material whereby such material is entrained in the mixture of hydrogen and oxygen and may be burned to reduce the oxygen content in the area of the flame and at a high temperature cone of a torch and around an area of material being welded so that such material, when welded, is not readily oxidized.

Another object of the invention is to provide a novel generator for the production of hydrogen and oxygen and means coupled thereto to provide for an increase in the B.t.u. output of a hydrogen and oxygen flame which is fed from the generator of the invention.

Further objects and advantages of the invention may be apparent from the following specification, appended claims and accompanying drawings, in which:

FIG. 2 is an axial sectional view of the electrolytic hydrogen and oxygen generator;

FIG. 3 is an enlarged side elevational view of the torch, of the present invention, showing portions thereof, broken away and in section to amplify the illustration;

FIG. 4 is an enlarged fragmentary sectional view of a flashback arrestor of the present invention;

FIG. 5 is an enlarged fragmentary sectional view of the bleed-off pressure regulator of the invention;

FIG. 6 is an enlarged fragmentary side elevational view of a modified form of the flash-back arrestor of the invention showing portions broken away and in section to amplify the illustration;

FIG. 7 is an end view of a modified form of generator for the electrolytic production of hydrogen and oxygen;

FIG. 8 is a side elevational view thereof;

FIG. 9 is a top or plan view of the modified generator for the electrolytic production of hydrogen and oxygen, as shown in FIGS. 7 and 8 of the drawings;

FIG. 10 is a sectional view taken from the line 10—10 of FIG. 9;

FIG. 11 is a sectional view of a hydrocarbon fluid entrainment tank of the present invention; and FIG. 12 is a fragmentary sectional view of a further modification of the invention.

Figure 1:
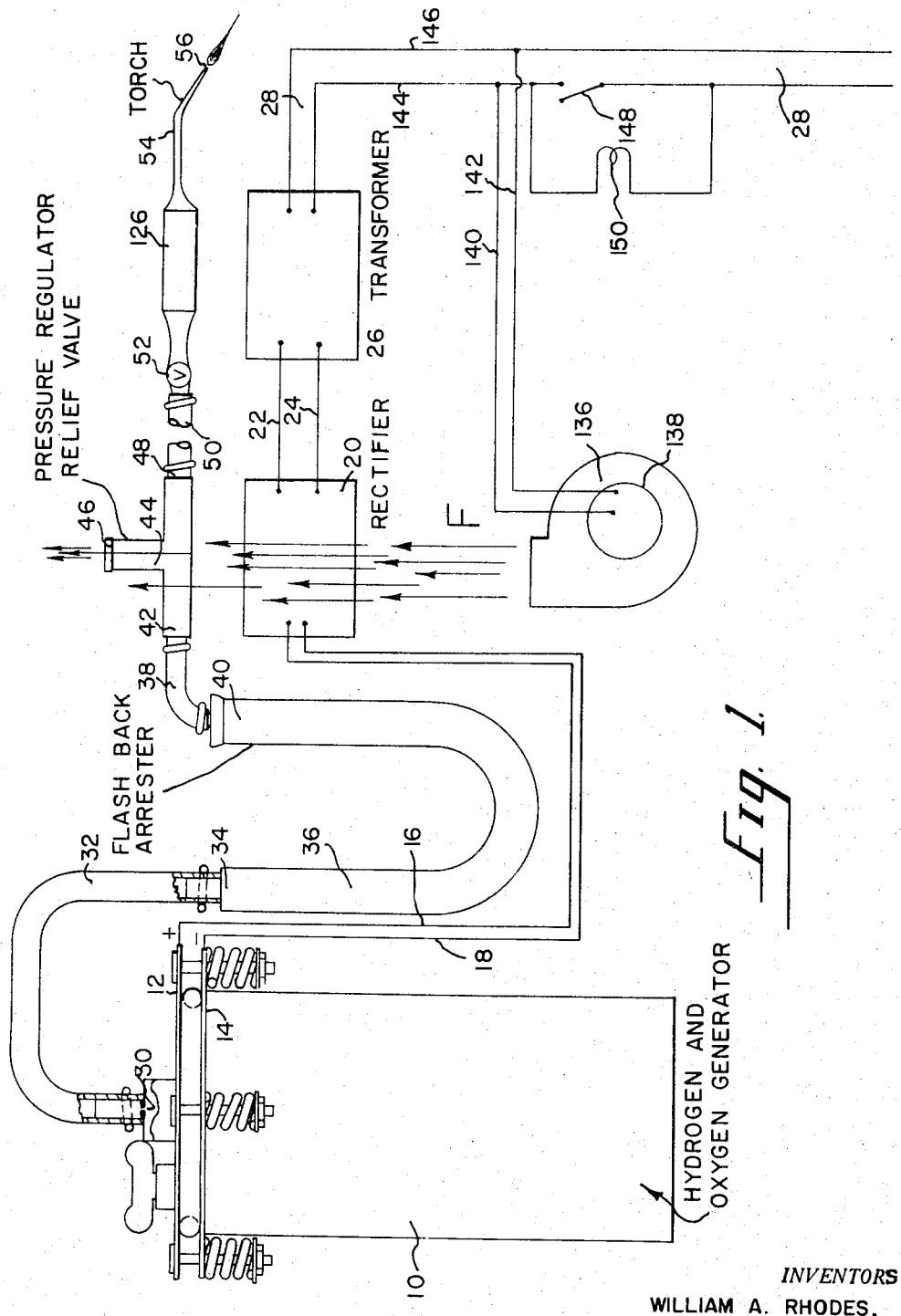
FIG. 1 is a diagrammatic view of an electrolytic hydrogen and oxygen producing generator together with a conduit means for delivering the hydrogen and oxygen to a torch and including flash-back arrestors and a power supply to the generator as well as a blower for cooling the rectifier and diluting bleed-off gas from the generator.

As shown in FIG. 1 of the drawings, an electrolytic hydrogen and oxygen generator 10 is provided with an anode 12 and cathode 14, electrically coupled to electrical conductors 16 and 18, respectively, which is supplied energy be means of a rectifier 20 receiving energy through conductors 22 and 24 from a transformer 26 coupled to a conventional alternating current line 28.

Hydrogen and oxygen produced by the generator 10 passes from an outlet 30 in the top of the generator 10 and into a tube 32 which is coupled to one upstanding leg 34 of a U-tube flash-back arrestor 36. Another tubular conduit is coupled to the opposite upstanding leg 40 of the U-tube flash-back arrestor 36 and this tube 38 conducts the mixture of hydrogen and oxygen to an inlet 42 of a bleed-off pressure regulator 44.

The bleed-off pressure regulator 44 is provided with a bleed-off outlet 46 disposed to deliver excess hydrogen and oxygen to the atmosphere and will be hereinafter described. The bleed-off pressure regulator 44 is provided with an outlet 48 to which a flexible conduit 50 is connected. The opposite end of this conduit 50 is connected to a torch valve 52 disposed to deliver the mixture of hydrogen and oxygen to a torch 54 having a top 56 at which combustion of hydrogen and oxygen takes place.

Referring now to details of the electrolytic hydrogen and oxygen generator, as shown in FIG. 2, it will be seen that the anode 12 provides a cover for the generator. This cover is coupled to the cathode 14, which generally forms the tank structure of the generator.

The cathode 14 comprises a long slender cylindrical tank portion 58 composed of pure iron from which hydrogen bubbles are produced, as will be hereinafter described. This cylindrical tank portion 58 is provided with an angular flange 60 which is slightly spaced from a similar flange 64 of the anode 12. Disposed between the flanges 60 and 62 is a compressible O-ring preferably made of resilient di-electric material such as rubber, or its equivalent. Bolts 68 extend through the flanges 60 and 62 and nuts 70, screwthreaded on the bolts 68, engage a washer 72, which bears against compression springs 74, engaging the flange 60, whereby the flanges 60 and 64 are forced toward each other into firm feeling engagement with the O-ring 66. Insulator sleeves 73 fit in openings 75 in the flange 64 and the bolts 68 extend through central openings 77 in the insulating sleeves 73.

The anode 12 is provided with a central cover portion 76 having a nickel-plated iron cylindrical section 78, welded or otherwise secured thereto, and extending downwardly and concentrically into the tank-shaped portion 58 of the cathode 14. The cathode 14 is pure iron and is provided with a bottom portion 80 having a pure iron upstanding cylindrical portion 82 welded or otherwise secured thereto. This cylindrical portion 82 of the cathode 14 is disposed concentrically of the cylindrical portion 78 of the anode, as hereinbefore described.

The tank portion 58 of the cathode 14 is partially filled with a solution of alkali and water. This solution is highly concentrated, the alkali being in an amount equal to that of the water, as for example, the weight of the alkali substantially equals the weight of the water.

The solution of water and alkali is disposed at a level slightly above an upper end 84 of the cylindrical portion 82 of the cathode 14.

As shown in FIG. 2 of the drawings, the upper surface of the solution is disposed as indicated by the line A and the cylindrical portion 78 of the anode is provided with openings 86 which are partially above and below the level A. These openings 86 permit foam to pass from a space 88 between the outer wall of the cylindrical portion 58 and the cylindrical portion 78.

The cylindrical portion 82 of the cathode is provided with openings 90 in its lower portion to permit circulation of the solution in the direction of arrows B, shown in FIG. 2 of the drawings.

During hydrogen and oxygen production, bubbles of both gases rise upwardly in the solution and foaming of the solution takes place at the upper surface thereof. This foaming action causes the solution to foam over into the upper open end 84 of the cylindrical portion 82, which causes a constant downflow of the solution therein. The openings 90 permit this downward flow and escape of the solution outwardly of the cylindrical portion 82 near the lower interior of the tank portion 58 of the cathode. These openings 90 are below a lower open end 92 of the cylindrical portion 78 of the anode so that the solution may circulate freely from the interior of the cylindrical portion 82 outwardly through the openings 90 and back into the tank portion 58 of the cathode.

The openings 86 in the cylindrical portion 78 of the anode permit foam and bubbles to pass from a space 88 hereinbefore described, into the interior of the cylindrical portion 78 of the anode.

In the central cover portion 76 of the anode, an outlet orifice 94 is provided to control flash-back into the generator 10, as will be hereinafter described in detail. This orifice 94 provides an outlet for a mixture of hydrogen and oxygen produced in the generator 10.

As shown in FIG. 2 of the drawings, the central cover portion 76 of the anode is provided with a screwthreaded filler plug 96, which may be removed to permit the addition of water to the alkali solution in the generator 10.

The tubular conduit 32 is coupled to a hollow cylindrical sleeve 100, welded or otherwise secured in the central cover portion 76 of the anode to provide an outlet for the mixture of hydrogen and oxygen produced in the generator. The orifice 94, as hereinbefore described, is disposed in the lower end of the tube 100 and this orifice may be approximately .050 of an inch in diameter as compared to an orifice diameter of .040 of an inch at the tip 56 of the torch 54, as will be hereinafter described in detail.

Direct current is supplied to the anode and cathode structures of the generator 10, in accordance with the concentration of the alkali, such as sodium hydroxide, or the equivalent, and water. The direct current is applied with low voltage and relatively high amperage, as for example, 4 volts at 250 amperes is suitable when using the foregoing, substantially saturated solution of alkali and water. This provides, for a current density of approximately 1 ampere to 1 square inch or less of the generator area.

It will be appreciated that the foregoing proportions of alkali and water represent a substantially saturated solution in which the alkali and water are substantially equal in weight. This highly concentrated solution tends to minimize electrical resistance with attendant temperature rise in the electrolyte and therefore permits the system to operate with low voltage and relatively high amperage. Additionally, it will be understood that, due to low resistance of the electrolyte, the efficiency of the system is high with a maximum production of hydrogen and oxygen gases in proportion to the size of the generator.

The flash-back arrestor 34 is a U-shaped tube having upstanding legs 36 and 40. This tube 34 contains non-inflammable liquid 102, which partially fills the legs 36 and 40.

The leg 36 is coupled to the tube 32 and disposed to receive a mixture of hydrogen and oxygen gases in a direction of the arrow C, in FIG. 4 of the drawings. The gases bubble through the liquid 102 and move upwardly in the leg 40 in a direction of the arrow D, in FIG. 4. The mixture of gases then passes upwardly through the tube 38 toward the bleed-off pressure regulator 44.

In the upper open end of the leg 40 of the U-tube 34 is a friction tight cork 104 having a solid, hollow tubular member 106 therein. An end 108 of the outlet tube 38 is clamped on the tubular member 106 by a resilient clamping ring 110. The cork 104, being secured in the upper end of the leg 40 by friction, may readily be blown out of the open end of the leg 40 when and if a flash-back explosion occurs in the leg 40 above the surface of the liquid 102.

The tube 38 is coupled to the inlet 42 of the pressure regulator 44, as shown in FIG. 5 of the drawings. This bleed-off regulator 44 is provided with a gas passage 112 having a vent opening 114 in its upper wall portion. Seated in the vent opening 114 is a ball 116 preferably made of nylon, other plastic, or stainless steel.

Supported on and above the ball 116 are relatively heavy steel balls 118 which tend firmly to hold the ball 116 intimately seated to close the vent opening 114. All of the balls 116 and 118 are supported in a guide tube 120, which is disposed vertically to support the balls directly above the vent seat 114.

It will be understood that the balls 118 may be made of various materials, as desired. However, these balls should be made of heavy material in order to provide sufficient pressure to attain a desired bleed-off pressure of gases through the vent opening 114. It will be understood that the bleed-off pressure through the vent opening 114 may be increased by adding heavy balls to the column above the balls 116. Conversely, the bleed-off pressure through the vent opening 114 may be reduced by reducing the number of heavy steel balls.

Various materials may be used in these pressure regulating balls, as desired, depending upon the requirements.

When gas pressure reaches a predetermined value in a conduit 112, the column of pressure regulating balls is raised slightly and the gas escapes upwardly therearound and through a vent opening 112 in a cap 124 at the upper end of the casing 120. The gas passing through the vent opening 112 will be diluted by a flow of atmosphere from a blower 136, as will be hereinafter described.

A pressure regulated mixture of hydrogen and oxygen passes from an outlet 14 of the bleed-off pressure regulator 44 through the flexible conduit 50 to a control valve 52 which regulates the flow of gases to the torch 54.

This torch 54 is provided with a handle portion 126 wherein a ceramic-type flash-back arrestor 128 is disposed.

As shown in FIG. 3 of the drawings, the handle portion 126 of the torch 54 is hollow and the ceramic flash-back arrestor 128 is intimately disposed in the hollow handle portion 126 in order completely to block combustion which may travel backwardly from the tip 56 of the torch 54 in a direction of the arrow E, in FIG. 3 of the drawings.

The flash-back arrestor 128, for example, may be made of a porous carborundum material, such as that used in grinding wheels. An 80 grit carborundum has been found very effective in arresting flash-back through the torch 54, to the tube 50.

It has been found that the torch 54 may be provided with tips 56 varying in orifice diameter from around .005 of an inch to .040 of an inch or greater and that under operating conditions employing orifice sizes in this range, the flash-back arrestor 128 effectively prevents flame travel from the torch 54 to the tube 50.

As shown in FIG. 6 of the drawings, a modified flash-back arrestor communicates with the tube 38 and is generally located in a position similar to that of the flash-back arrestor 34. This flash-back arrestor, as shown in FIG. 6 of the drawings, is provided with a vertical tube 130 having a friction-connected cork 105 in the upper end thereof which is similar to the cork 104, hereinbefore described in connection with the upper end of the leg 40 of the flash-back arrestor 34.

The tube 130 is partially filled with water 132 and the lower end of the tube 130 is provided with a reduced tube section 134 to which is connected an extension of the tube 32, shown in FIG. 1 of the drawings.

In operation, the modified flash-back arrestor 130, permits a mixture of hydrogen and oxygen to bubble upwardly through the water 132 and in the event of a flash-back through the tube 38, the cork 104 may be blown out of the upper end of the tube 130 and the liquid 132 may pass back through the tube 32 but cannot pass rapidly through the orifice 94 at the outlet of the generator, as shown in FIG. 2. This is a small orifice and might permit only a very small portion of the water 132 to pass therethrough before force of the flash-back explosion in the upper end of the tube 130 is relieved by expulsion of the cork 105.

As shown in FIG. 1 of the drawings, a blower 136 delivers air in a direction as indicated by arrows F so that this air travels over the rectifier 20 for cooling the same and also passes the bleed-off pressure regulator 44 in order to dilute the excess mixture of hydrogen and oxygen which bleeds off through the orifice 122, shown in FIG. 5 of the drawings. The volume of air delivered by the blower 136 is sufficient completely to dilute the mixture of oxygen and hydrogen passing from the orifice 122 in order to render it non-combustible, thus, the mixture of these gases leaving the bleed-off pressure regulator 44 cannot be ignited and thus such hazard is eliminated.

The blower 136 is provided with a motor 138 electrically coupled by conductors 140 and 142 to conductors 144 and 146 of the alternating current supply 68. A switch 148 is disposed to break the alternating current supply 28 and is disposed in the line 144, thus the blower 136 and transformer 26 are concurrently energized when the switch 148 is closed.

Coupled to the line 144 around the switch 148 is a lamp 150 of low wattage capacity which always permits a small amount of energy to be conducted to the transformer 26 and rectifier 20 so that the electrolytic generator 10 always produces a very small amount of hydrogen and oxygen. This may amount to only a bubble now and then, whereby the gases in the generator are not permitted to recombine completely and evacuate the generator when the switch 148 is open. Only enough hydrogen and oxygen is thus generated to prevent evacuation of the generator 10.

If the generator 10 is completely de-energized, the hydrogen and oxygen gases therein eventually recombine and cause evacuation of the generator. If this is permitted, the modified flash-back arrestor, shown in FIG. 6, is also evacuated whereby the water 102 therein is slowly drawn into the generator through the orifice 94. Subsequently, when the torch 56 is ignited, and in the event of undetected damage to the flash-back arrestor 128, then the flash-back arrestor might fail and permit flame to travel all the way back to the generator 10.

The U-tube flash-back arrester 34 is not adversely affected by evacuation of hydrogen and oxygen in the generator, since the loop at the lower end of the U-tube structure always may retain water.

The lamp 150 thus serves the purpose of maintaining a small amount of energy to be conducted by the generator 10 to produce a nominal amount of hydrogen and oxygen, sufficient only to prevent total recombining of the gases in the generator and thereby to prevent evacuation of the flash-back arrestor 34.

Referring to FIG. 2 of the drawings, it will be seen that the generator 10 may relieve explosive pressure internally thereof, due to operation of the spring-loaded cover 76, forming a part of the anode 12.

Should an explosion take place in the generator 10, the cover 76 may be raised by internal pressure, permitting a relief of gas outwardly around the O-ring 66. This relief is permitted by resilience of the springs 74, which may be compressed and thereby permit the cover 76 to move upwardly relative to the O-ring 66 and thereby vent pressure from the interior of the generator 10.

As shown in FIG. 7 of the drawings, the modification of the invention comprises a frame and heat sink structure 152 which is generally U-shaped. This frame structure is provided with a pair of substantially vertical side plates 152 and 156 integral with which is a base plate 158. The frame and heat sink structure 152 is preferably made of aluminum or other material having a heat transfer rate. Thus, the frame serves as an efficient heat sink structure to dissipate heat from the generator, transformer and rectifier devices, as will be hereinafter described in detail.

Disposed between the side plates 154 and 156 is a generator base plate 160 to which is welded an upstanding hollow cylindrical generator casing 162 which serves as a reactor cathode for electrolytic production of oxygen, as will be hereinafter described. This casing 162 is preferably made of steel pipe or tubing and is peripherally welded at 164 to the base plate 160.

The upper annular edge 166 of the casing 162 is engaged with a sealing gasket 168 held in a groove 170 of a cover 172 to the lower side of which is welded a hollow tubular reactor anode 174. This anode 174 is preferably made of steel pipe or tubing and is suspended concentrically in the outer casing 162 and provided with a lower end 176 spaced from the upper surface of the base plate 160, all as shown best in FIG. 10 of the drawings. The casing 162 is provided with an internally threaded wall 178; conventional screwthreading of this wall 178 provided extended surface area thereof for a large volume production of oxygen in proportion to the overall external dimensions of the casing 162.

It will be understood that the extended surface area of the internal wall of the casing 162 may be provided by other means than the screwthreads 178, as for example, inwardly directed fins, or the like. The annular construction of the casing 162 is very readily provided with an internal screwthread 178 which is the simplest manner of extending the internal cathode surface area of the generator.

The reactor anode 174 is provided with external annular screwthreads 180 to extend the surface area of the anode for the production of a maximum amount of hydrogen in proportion to the size of the generator.

It will be obvious to those skilled in the art that since this reactor anode 174 is annular, that external annular fins may be provided in lieu of the screwthreads 180.

The upper end of the tubular anode structure 174 is welded at 182 to the cover 172 and the gasket 168 acts to insulate the cover 172 from the cathode casing 162, as will be hereinafter described.

Concentrically of the cover 172 is a filler neck 184 of hollow cylindrical construction which is peripherally welded at 186 in a central opening in the cover 172.

A cap 188 is screwthreaded on the neck 184 and is provided with a gasket 190 to provide for a sealing engagement of the cap 188 with the upper end of the filler neck 184.

Disposed concentrically and internally of the hollow cylindrical anode 174 is a float 192 preferably made of styrofoam, or the like.

This float 192 is mounted on a rod 194 having a shoulder 196 thereon against which the float 192 moves upwardly while buoyantly supported on the electrolyte 198 in the generator. The rod 194 is provided with a lower end 200 which may engage the base plate 160 when the electrolyte 198 is at a low level. The rod 194 is also provided with an upper end 202 which may be level with the upper end of the filler neck 184 when the electrolyte 198 is at a proper level in the generator. Thus, the addition of water through the filler neck 184 may be contained until the float 192 rises to carry the upper end 202 of the rod 194 to a position which is substantially level with the upper end of the filler neck 184. This charges the generator with a proper amount of water so that the electrolyte is at a proper concentration and capable of electrolyzing water into hydrogen and oxygen gases.

The cathode casing 162 at its internal screwthreads 168, generates oxygen which passes upwardly, as indicated by arrows in FIG. 10 of the drawings; said oxygen being produced on the extended surface area of the threads 178 while comparable action of the anode on its externally screwthreaded portion 180, produces hydrogen and these gases mix above the electrolyte 198 and pass upwardly through an opening 204 in the side wall of the reactor anode adjacent the cover plate 172. Thus, the gases pass inwardly to the interior of the anode 174 and pass outwardly through a tube fitting 206 screwthreaded in the cover 172. A tube 208 is coupled to the fitting 206 and extends to a flash-back arrester casing 210 having a porous stone 212 therein through which the mixture of hydrogen and oxygen passes to a tubular conduit 214, as will be hereinafter described in detail.

The electrolyte 198 in the generator is preferably as disclosed in a patent application of William A. Rhodes for Electrolyte Solution, Ser. No. 109,521, filed May 12, 1961.

As shown in FIG. 7 of the drawings, the structure of the generator and the frame and heat sink 152, are held in assembly by four bolts 216. These bolts 216 are provided with lower screwthreaded ends 218 which are screwthreaded in the base plate 158 and disposed on the screwthreaded portions of the bolts 216 are jam nuts 220 which are tightened downwardly upon the upper portion of the base plate 160 of the generator casing 162 to hold said plate intimately engaged with the base plate 158 of the frame and heat sink structure.

Surrounding the normally upper ends of the bolts 126 are electrical insulation bushings 222 which insulate these bolts from the cover 172 and engaging the insulation bushings are steel bushings 224 engaged by screwthreaded nuts 226 which firmly clamp the cover 172 downwardly to hold the gasket 168 intimately in sealing engagement with the upper peripheral edge 166 of the generator casing 162.

The cover 172 by means of the insulation bushings 22 and the gasket 168 is completely electrically insulated from the generator casing cathode structure and, as hereinbefore described, the anode 174 is electrically coupled to the cover 172 by the welding 182.

An electrical conductor 228 is coupled by means of a screw 230 to the cover 172 and this electrical conductor 228 is also coupled to a transformer 232.

Another conductor 234 coupled to the transformer is connected through a diode rectifier 236 with the side wall 154 of the frame and heat sink structure, all as shown best in FIGS. 7 and 10 of the drawings.

It will be seen that the diode rectifier is electrically connected and thermally conductively coupled to the plate 154 by means of a bolt 238 and that the base plate 158 of the frame is electrically coupled to the casing 162 which is the generator cathode.

A conventional 110-volt alternating current line 240 is provided with a pair of conductors 242 and 244 which are connected to a switch 246 and a fuse 248, respectively. A conductor 250 extends from the fuse 248 to one winding of the transformer 232 and a pair of conductors 242 and 244 extend to multiple windings of the transformer 232 to vary the output thereof in order to provide for varying amounts of energy to be dissipated from the cathode and anode structures 162 and 174, respectively, whereby a variation may be attained in the amount of hydrogen and oxygen delivered through the tube 208 and flash-back arrestor 210 to the tube 214.

The tube 214 delivers a mixture of hydrogen and oxygen into a fluid containing tank 256, as shown in FIG. 11 of the drawings, and indicated by arrows A, in FIGS. 10 and 11 of the drawings.

The mixture of hydrogen and oxygen passes downwardly into a tube 258 which is supported in a cover 260 and sealed relative thereto. The cover 260 is provided with a gasket 262 engaged in sealed relation with an upper end 264 of the tank 256. A screwthreaded skirt 266 of the cover 260 is screwthreaded on the upper end of the tank 256 for holding the cap 260 in sealed relation therewith.

Disposed in the tank 256 is a fluid such as methyl alcohol, designated 268, or any equivalent fluid.

A tube 258 extends downwardly into this fluid and is provided with a reverse bend having an upwardly extending portion 270 in which a ball check valve 272 is disposed. A mixture of hydrogen and oxygen bubbles up around the ball 272 and passes upwardly through the fluid 268 and outwardly through a tube 274, as shown in FIGS. 10 and 11 of the drawings.

The mixture of hydrogen and oxygen then passes through a torch 276, shown in FIG. 9 of the drawings, to a combustion flame 278.

The methyl alcohol is entrained in the hydrogen and oxygen and adds to the B.t.u. content of these two gases while at the same time tends to consume excess oxygen in the gases and secondary oxygen from the surrounding atmosphere so that any materials being welded by the flame 278 are thus surrounded by a reducing atmosphere which tends to combine with oxygen surrounding the area of the weld thereby preventing oxidation of the materials being fused.

The torch 278 is provided with a flame holding orifice which may be as small as .014 of an inch in diameter. A small amount of aqueous condensate may tend partially to clog this fine orifice, however, the entrained methyl alcohol automatically clears any such aqueous condensate from this orifice, thus keeping it clear and operative.

During operation of the modified form of the invention, as shown in FIGS. 10 and 11 of the drawings, hydrogen and oxygen gases may be under slight pressure in the tank 256 above the hydrocarbon fluid 268 therein. Due to a restriction of a flame holding orifice 280 of the torch 276, residual pressure in the tank 256 above the electrolyte 268 may remain for a period of time after the generator is shut off. Accordingly, the check valve 272 is disposed to prevent flow of hydrocarbon fluid 268 backwardly through the tube 258 in the event the cap 188 of the filler neck 184 is removed before such residual pressure in the tank 256 has been relieved through the orifice 280 of the torch 276. Thus, the check valve 272 effectively prevents hydrocarbon fluid from flowing backwardly into the generator and into the electrolyte 198 therein.

The check valve 272 is also effective to prevent backflow of hydrocarbon fluid into the generator after the operation of the generator is discontinued. Under these conditions, the remaining mixture of hydrogen and oxygen in the generator tends to recombine into water thus creating a partial vacuum in the generator which tends to pull fluid from the tank 256 backwardly into the generator.

In the modification, as shown in FIG. 12 of the drawings, the anode 174 is similar in construction to that shown in FIG. 10 of the drawings but is welded to a narrow strap 284 which is held to the cover 260 by bolts 286 and 288. The bolt 286 extends through a fixture 290 of the conductor 228, hereinbefore described.

It will be understood that the casing 162 which forms the cathode of the generator, may be made of bare steel and that the anode 174, shown in FIGS. 10 and 12 of the drawings, may also be made of steel and since it produces oxygen, destruction of this anode gradually takes place and it is therefore to be considered as an expendable item to the generator. Accordingly, in the modification, as shown in FIG. 12 of the drawings, the narrow strap 284 permits replacement of the anode 174 by simple removal of the bolts 286 and 288. These bolts extend through the cover 260 and are sealed with suitable cement so that no leakage of hydrogen and oxygen may take place around these bolts.

It will be appreciated that the anode and cathode structures, as shown in FIG. 12 of the drawings, is also preferably provided with an extended surface area structure comprising simple threads. This extended surface area structure may take other physical form, as for example, the anode 174 may be a perforate tube or may have various undulated surface structure providing an overall area greater than the geometric unity of the physical surfaces. Thus, the terms "extended surface area" used herein may define any structure of the cathode and anode elements of the invention which has surface area which is either finned and ridged, undulating or perforate to provide an extended surface area greater than the geometric unity of the structures from which the hydrogen and oxygen may be emitted.

This is obviously an advantage to provide for a very compact generator structure having optimum production capabilities in accordance with its overall size.

It will be noted that the structure of the generator, as shown in FIG. 7 of the drawings, may be capable of withstanding a flash-back explosion therein without the danger of damaging the generator. It has been found that the explosion of hydrogen and oxygen in such a generator may be self-contained without creating unduly high pressures.

It will be obvious to those skilled in the art that various modifications of the present invention may be resorted to in a manner limited only by a just interpretation of the following claims.

We claim:

1. In a means of the class described, the combination of: an electrolytic oxygen and hydrogen generator having a common outlet conductor for oxygen and hydrogen, said conductor having a restriction therein; a flash-back arrestor communicating with said conductor; a tubular member of said flash-back arrestor disposed vertically; noninflammable liquid in said tubular member; the lower end of said tubular member communicating with said conduit; an outlet at the upper end of said tubular member; a bleed-off pressure regulator communicating with said last mentioned outlet; said bleed-off pressure regulator having a vent therein, means disposed to close said vent and release gas therethrough at a predetermined pressure; a delivery outlet for said bleed-off pressure regulator to deliver hydrogen and oxygen therefrom; a torch communicating with said outlet of said bleed-off pressure regulator.

2. In a means of the class described, the combination of: an electrolytic oxygen and hydrogen generator having a common outlet conductor for oxygen and hydrogen, said conductor having a restriction therein; a flash-back arrester communicating with said conductor; a tubular member of said flash-back arrester disposed vertically; water in said tubular member; the lower end of said tubular member communicating with said conduit; an outlet at the upper end of said tubular member; a bleed-off pressure regulator communicating with said last-mentioned outlet; said bleed-off pressure regulator having a vent therein, means disposed to close said vent and release at a predetermined pressure; an outlet for said bleed-off pressure regulator to deliver hydrogen and oxygen therefrom; a torch communicating with said outlet of said bleed-off pressure regulator; a second flash-back arrester in said torch; said second flash-back arrester comprising a ceramic member through which hydrogen and oxygen must pass to reach the combustion end of said torch.

3. In a means of the class described, the combination of: an electrolytic oxygen and hydrogen generator having a common outlet conductor for oxygen and hydrogen, said conductor having a restriction therein; a flash-back arrester communicating with said conductor; a tubular member of said flash-back arrester disposed vertically; liquid in said tubular member; the lower end of said tubular member communicating with said conduit; an outlet at the upper end of said tubular member; a bleed-off pressure regulator communicating with said last-mentioned outlet; said bleed-off pressure regulator having a vent therein, means disposed to close said vent and release at a predetermined pressure; an outlet for said bleed-off pressure regulator to deliver hydrogen and oxygen therefrom; a torch communicating with said outlet of said bleed-off pressure regulator, a blower disposed to deliver air around said bleed-off pressure regulator to dilute the mixture of hydrogen and oxygen bled therefrom to render it non-combustible.

4. In a means of the class described, the combination of: an electrolytic hydrogen and oxygen generator having a common outlet conductor for oxygen and hydrogen, said conductor having a restriction therein; a flash-back arrester communicating with said conductor; a tubular member of said flash-back arrester disposed vertically; water in said tubular member; the lower end of said tubular member communicating with said conduit; an outlet at the upper end of said tubular member; a bleed-off regulator communicating with said last mentioned outlet; said bleed-off pressure regulator having a vent therein, means disposed to close said vent and release at a predetermined pressure; an outlet for said bleed-off pressure regulator to deliver hydrogen and oxygen therefrom; a torch communicating with said outlet of said bleed-off pressure regulator, a power supply for said generator comprising a rectifier; a transformer for delivering power to said rectifier; conductors for delivering power to said transformer; a switch in one of said conductors; and a low wattage power consumption device around said switch whereby said transformer is constantly provided with a very small amount of electrical energy to continuously energize said generator with a very small amount of current to prevent total recombining of oxygen and hydrogen therein when the major power supply of said transformer is shut off.

5. In an electrolytic hydrogen and oxygen generator system, the combination of: an electrolytic hydrogen and oxygen generator anode and cathode means therein, conductors coupled to said anode and cathode means; a rectifier for delivering direct current to said conductors; means for supplying electrical energy to said rectifier; switch means for shuting off said last mentioned electrical energy; and a low wattage power consumption device around said switch means for constantly supplying a very small amount of energy to said rectifier whereby a small amount of energy is constantly supplied to said generator in order to prevent total recombining of all the oxygen and hydrogen in said generator when the main power supply thereto is shut off.

6. In an electrolytic hydrogen and oxygen generator system the combination of: an electrolytic generator disposed to produce oxygen and hydrogen; a restricted outlet for said generator disposed to deliver hydrogen and oxygen from said generator; and a flash-back arrestor communicating with said restricted outlet comprising a vertical tube liquid therein, said restricted outlet from said generator communicating with the lower end of said tube and below the surface of liquid therein; and an outlet for said tube for the delivery of hydrogen and oxygen to a burner.

7. In an electrolytic hydrogen and oxygen generating and consumption system the combination of: an electrolytic hydrogen and oxygen generator; an outlet therefor disposed to deliver hydrogen and oxygen in a mixture; a conduit communicating with said outlet; a flash-back arrestor communicating with said conduit, said flash-back arrestor comprising a porous member through which said mixture of hydrogen and oxygen from said conduit may pass; and a torch disposed to receive a mixture of hydrogen and oxygen through said porous member whereby a tendency of flame to pass from said torch to said generator is reduced by said flash-back arrestor said torch having a gas passage orifice ranging in diameter from .005 inch to .040 inch.

References Cited
UNITED STATES PATENTS

| | | | |
|---|---|---|---|
| 1,259,317 | 3/1918 | Thompsson | 137—533.11 |
| 2,098,629 | 11/1937 | Knowlton | 158—117.5 X |
| 2,447,086 | 8/1948 | Olson et al. | 158—27.4 |
| 2,686,153 | 8/1954 | Hoenes | 204—278 |
| 3,031,285 | 4/1962 | Hedberg | 48—192 |
| 3,096,825 | 7/1963 | Clark | 137—533.11 |

FREDERICK L. MATTESON, JR., *Primary Examiner.*

E. G. FAVORS, *Assistant Examiner.*